United States Patent
Jin et al.

(10) Patent No.: US 8,036,069 B1
(45) Date of Patent: Oct. 11, 2011

(54) PLASMON SHIELD TO SHAPE AND REDUCE OPTICAL SPOT

(75) Inventors: Xuhui Jin, San Jose, CA (US); Yuchen Zhou, San Jose, CA (US); Joe Smyth, Aptos, CA (US); Tobias Maletzky, Milpitas, CA (US); Kenichi Takano, Santa Clara, CA (US); Erhard Schreck, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/802,096

(22) Filed: May 28, 2010

(51) Int. Cl.
*G11B 11/00* (2006.01)

(52) U.S. Cl. ............ 369/13.32; 369/13.33; 369/112.27; 369/13.13; 360/245.3; 360/59

(58) Field of Classification Search ............... 369/13.02, 369/13.33, 112.27, 13.32, 13.13, 13.24; 360/59, 360/128, 245.3
See application file for complete search history.

(56) References Cited

U.S. PATENT DOCUMENTS

| | | | |
|---|---|---|---|
| 6,689,545 B2 | 2/2004 | Kasama et al. | |
| 7,547,868 B2 | 6/2009 | Hongo et al. | |
| 7,596,072 B2 | 9/2009 | Buechel et al. | |
| 7,612,323 B2 | 11/2009 | Okitsu et al. | |
| 7,643,248 B2 | 1/2010 | Sluzewski | |
| 7,821,732 B2* | 10/2010 | Komura et al. | 360/59 |
| 7,821,880 B2* | 10/2010 | Tanaka et al. | 369/13.33 |
| 2008/0192376 A1 | 8/2008 | Tanaka et al. | |
| 2008/0198496 A1 | 8/2008 | Shimazawa et al. | |
| 2010/0315735 A1* | 12/2010 | Zhou et al. | 360/59 |

OTHER PUBLICATIONS

Co-pending US Patent HT09-003, U.S. Appl. No. 12/456,290, filed Jun. 15, 2009, "Plasmon Antenna With Magnetic Core for Thermally Assisted Magnetic Recording," assigned to the same assignee as the current invention.

* cited by examiner

*Primary Examiner* — Ali Neyzari
(74) *Attorney, Agent, or Firm* — Saile Ackerman LLC; Stephen B. Ackerman

(57) ABSTRACT

A TAMR head is disclosed with a triangular shaped plasmon antenna covered on two sides with a plasmon layer that generates an edge plasmon mode along a vertex of the two plasmon sides formed opposite a main pole layer. A plasmon shield (PS) is formed along the ABS and opposite the vertex to confine an electric field from the edge plasmon mode within a small radius of the edge plasmon tip thereby reducing the optical spot size on the magnetic medium and enhancing writability. An end of a waveguide used to direct input electromagnetic radiation to the plasmon antenna adjoins a PS side opposite the ABS. In one embodiment, a magnetic shield may be formed along the ABS and adjoins the PS so that a first PS section terminates at the ABS and faces the vertex while a second PS section is formed between the magnetic shield and waveguide end.

31 Claims, 9 Drawing Sheets

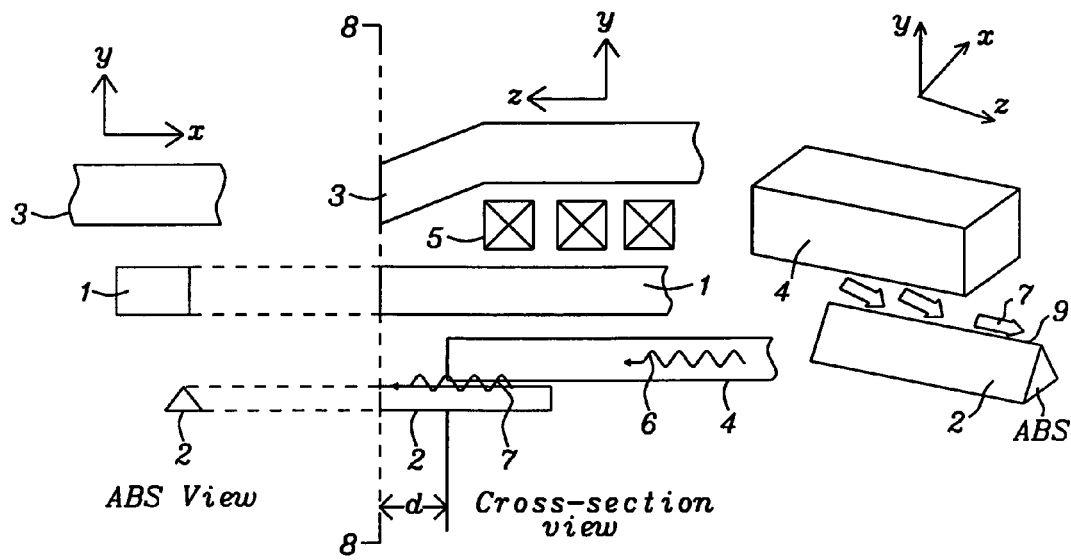
FIG. 1 — Prior Art
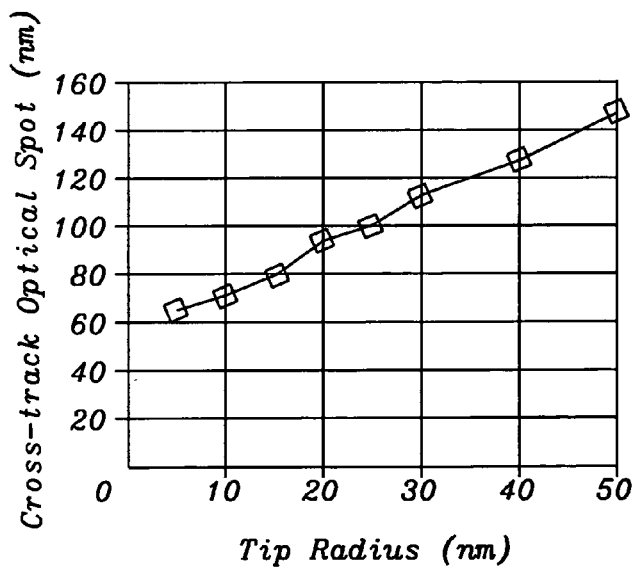 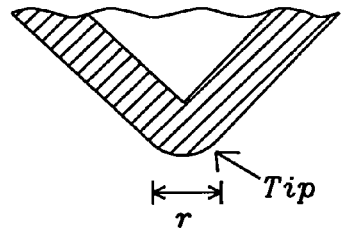
FIG. 2a    FIG. 2b

US 8,036,069 B1

PLASMON SHIELD TO SHAPE AND REDUCE OPTICAL SPOT

RELATED PATENT APPLICATION

This application is related to the following: Ser. No. 12/456,290, filing date Jun. 15, 2009; assigned to a common assignee and herein incorporated by reference in its entirety.

FIELD OF THE INVENTION

The invention relates to magnetic read/write heads based on thermally assisted magnetic recording (TAMR) and in particular to a structure in which a plasmon antenna (PA) is included with a plasmon shield to enable the transfer of thermal energy with a small spot size at the media for higher recording density.

BACKGROUND OF THE INVENTION

TAMR is expected to be one of the future generation of magnetic recording technologies that will enable recording at ~1-10 Tb/in$^2$ data densities. TAMR involves raising the temperature of a small region of the magnetic medium to near its Curie temperature where both of its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, with a sharp temperature gradient of TAMR acting alone or in combination with a high magnetic field gradient, data storage density can be further improved with respect to current state of the art recording technology.

In addition to the components of conventional write heads, a TAMR head also typically includes an optical wave guide (WG) and a plasmon antenna or plasmon generator (PG). The wave guide serves as an intermediate path to guide the external laser light to the PA or PG where the light optical mode couples to the local plasmon mode of the PA or to the propagating plasmon mode of the PG. After the optical energy is transformed to plasmon energy, either with local plasmon excitation in the PA or with energy transmission along the PG, it is concentrated at the medium location where heating is desired. Ideally, the heating spot is correctly aligned with the magnetic field from the write head to realize optimum TAMR performance. However, in the prior art, alignment has been difficult to achieve and the spot size is typically around 100 nm or greater which is significantly larger than the <50 nm size needed to make the first generation of TAMR devices highly efficient.

A thermally assisted magnetic head structure disclosed in U.S. Patent Application Publications 2008/0192376 and 2008/0198496 employs an edge plasmon mode that is coupled to a wave guide as represented in FIG. 1. Conventional components of a magnetic recording structure as shown as a main pole 1, return pole 3, and write coils 5 formed along an air bearing surface (ABS) 8-8. The wave guide 4 guides the input optical light wave 6 toward the ABS 8-8 in the center cross-sectional view. As shown in the prospective view, plasmon generator 2 has a triangular shape and extends a certain distance from the ABS before meeting WG 4. Optical wave 6 couples to the edge plasmon (EP) mode 7 that is excited and propagates along the sharp edge 9 of plasmon generator 2 adjacent to the WG 4. Plasmon mode 7 further delivers the optical power toward the ABS and locally heats a medium (not shown) placed underneath the plasmon generator 2. A plasmon generator is typically made of noble metals such as Ag and Au that are known to be excellent generators of optically driven surface plasmon modes. The local confinement of the edge plasmon mode 7 is determined by the angle and radius of the triangle corner.

In theory, an edge plasmon generator (EPG) can be engineered to achieve a very tiny light spot as well as a high temperature gradient in the medium for a TAMR recording scheme. Moreover, a plasmon generator with a substantial length in a direction perpendicular to the ABS will have a large metal volume that can avoid localized heating damage during TAMR writing compared to an isolated plasmon antenna of smaller volume. In TAMR, a written bit strongly depends on the thermal spot size and shape in the recording layer, and on the alignment between the magnetic gradient and thermal gradient. The magnetic medium is heated by an EPG in which the optical energy is confined around the tip of the EPG thereby forming a so-called edge plasmon mode. Clearly, the confinement of the optical spot or EP mode in this design is a function of the shape, angle, and size of the tip, the metal composition of the EPG, and the dielectric material surrounding the tip.

Referring to FIG. 2a, optical modeling data for a 90 degree gold EPG is shown that indicates the dependency of optical spot size in a cross-track direction on the tip radius of the EPG. It should be understood that although the design typically includes a "V" shape for the tip, the actual shape realized from state of the art fabrication methods is substantially rounded as illustrated in FIG. 2b with a tip radius r. For a 25 nm tip radius, the optical spot size in the medium is about 100 nm (FIG. 2a). Even with a 5 nm tip radius, it is difficult to obtain a spot size less than 50 nm which is desired for the first generation of TAMR products. Furthermore, those skilled in the art will appreciate that it is very difficult to fabricate a sharp tip with a 5 nm tip radius with good tolerance necessary for a manufacturing process.

Thus, there is a need to further reduce spot size using an EPG tip radius that is easily manufactured in order to improve the performance of TAMR writing and make it competitive with other new technologies such as microwave assisted magnetic recording (MAMR).

A routine search of the prior art resulted in the following references. However, there is still an unmet need to reduce heating spot size in a TAMR design.

U.S. Pat. No. 7,643,248 discloses a plasmon resonator having a metal pin where the oscillation direction of the surface plasmon of a conductive body is about parallel to the oscillation direction of the surface plasmon of a conductive scatterer.

In U.S. Pat. No. 7,612,323, an optical element is described that generates near-field light smaller than a condensing spot near a condensing point.

U.S. Pat. No. 7,596,072 teaches that optical spot dimensions are determined by the dimensions of a small metal structure inside an optical recording head that includes a waveguide and phase change storage medium. Theoretically, the optical spot can be as small as 20 nm.

In U.S. Pat. No. 7,547,868, an optical near-field generating apparatus includes a conductive scatterer that causes an optical near field based on a surface plasmon to be generated by being illuminated by incident light. A small optical spot can be achieved.

In U.S. Patent Application 2003/0011722, a light shielding film in a near-field light generating element is disclosed.

SUMMARY OF THE INVENTION

One objective of the present invention is to minimize the optical spot size produced in a magnetic medium by an edge plasmon generator (EPG) without scaling down the tip size and changing the tip angle of the EPG.

A second objective of the present invention is to minimize the optical spot size in an EPG design without significantly affecting the plasmon mode and without reducing the overall optical efficiency.

These objectives are achieved in various embodiments of the present invention wherein a TAMR write head comprises a main pole that has an edge plasmon generator (EPG) adjoining a trailing portion of a pole tip region along the ABS and extending a certain distance along a surface of the main pole towards the back end of the write head. Preferably, the EPG has a triangular design having two sides made of a plasmon layer comprising a highly conductive, non-magnetic metal that intersect at a vertex which is substantially a straight edge. The third side of the triangular shape and a core formed between the two EPG sides is made of a magnetic material. The third side and core may be considered the leading portion of the main pole layer and are generally made of the same magnetic material as in the main pole. In all embodiments, the vertex is essentially formed perpendicular to the ABS and faces a waveguide that is formed with an end at the ABS or recessed a certain distance from the ABS to reduce optical leakage. The waveguide extends in a lengthwise direction parallel to a lengthwise direction of the EPG that is towards the back end of the TAMR head. EPG sides are covered with a dielectric layer separating the EPG and waveguide and having a low index of refraction in order to enable efficient optical radiation transfer from the waveguide to EPG. A key feature of the present invention is a plasmon shield formed between an end of the waveguide facing the ABS and the EPG thereby enabling a smaller optical spot size to be focused on the magnetic medium during a writing process. The plasmon shield is made of a noble metal with a thin skin depth to shunt the electric field and maintain the edge plasmon mode in the vicinity of the EPG vertex to provide improved optical efficiency. The plasmon shield has a first surface along the ABS and a second surface facing the vertex and separated from the vertex and EPG sides by the aforementioned dielectric layer.

From a cross-sectional view that shows TAMR head components having a height dimension in a direction perpendicular to the ABS, the second surface of the plasmon shield and a surface of the waveguide facing the EPG form a plane that is perpendicular to the ABS. The waveguide generally extends to the back end of the TAMR head and has a height significantly larger than that of the EPG. In one embodiment, the interface between the waveguide and plasmon shield may be formed parallel to the ABS. In a preferred embodiment for improved optical efficiency, the surface of the plasmon shield opposite the ABS and including the interface with the waveguide is sloped with respect to the ABS such that the height of the second surface is less than the height of the plasmon shield side that faces away from the EPG.

In yet another embodiment, the plasmon shield may be formed on a magnetic shield such as a leading shield or trailing shield. In this case, a first portion of the plasmon shield separates the magnetic shield from the EPG and a second portion of the plasmon shield separates the magnetic shield from the waveguide. Preferably, the surface of the plasmon shield opposite the ABS is tapered as described previously to improve the optical efficiency.

There are also various embodiments of the plasmon shield that relate to the shape of the second surface facing the EPG. In one embodiment, the second surface is essentially a planar side. Alternatively, the second surface may be a concave design comprising a notch wherein a certain amount of plasmon shield material is removed from the second surface to form a trench that runs parallel to the edge of the EPG. The trench may have a "V" shape where two sides intersect at a vertex aligned below the vertex of the EPG. Optionally, the trench may have a trapezoidal shape with two sloped sides that are each substantially parallel or not parallel to a facing EPG side. The second surface may also comprise a protrusion or convex design in the shape of a trapezoid or triangle wherein the shorter flat trapezoid side or triangle tip is formed opposite the vertex of the EPG. In an embodiment where the plasmon shield is formed on a magnetic shield, the plasmon shield may have an opening opposite the EPG vertex such that the magnetic shield forms a portion of the second surface and is coplanar with two adjoining portions of the plasmon shield in order to reduce the write gap distance. Alternatively, the plasmon shield may have a triangular notch formed in the side that interfaces with the magnetic shield such that the vertex of the triangle which is a protrusion of the magnetic shield faces the EPG vertex.

The present invention also includes a method of fabricating a plasmon shield in a TAMR head. A cladding layer and waveguide core are sequentially laid down on a substrate. The waveguide layer is patterned by a photolithography and etching sequence such that a front end is recessed a certain distance from a first plane that is parallel and proximate to the eventual ABS. A plasmon material layer is deposited in an opening between the front end of the waveguide and the first plane and a chemical mechanical polish (CMP) step is employed to make a top surface of the plasmon material layer coplanar with a top surface of the waveguide. A dielectric gap layer is deposited on the waveguide and plasmon material layer and then a "V" shaped trench is formed in the dielectric gap layer above a portion of the plasmon material layer and waveguide. The trench has a first end proximate to the first plane and a lengthwise dimension in a direction perpendicular to the first plane (and eventual ABS). A plasmon generator material is deposited to line the sidewalls of the trench. Thereafter, a main pole layer is deposited on the plasmon generator layer (EPG). A top portion of the TAMR head including an overcoat layer on the main pole is deposited and then a lapping process is performed to form an ABS along the plasmon material layer (plasmon shield), and along an end of the EPG that adjoins the main pole tip. From an ABS view, the dielectric gap layer separates a tip of the EPG from the plasmon shield.

BRIEF DESCRIPTION OF THE DRAWINGS

FIG. 1 shows a prior art TAMR structure with a plasmon generator having a triangular shape and operating in an edge plasmon mode.

FIG. 2a is a plot illustrating the relationship between cross-track optical spot size and edge plasmon generator tip radius for a 90 degree gold EPG design, and FIG. 2b shows curvature in a "V" shaped tip design.

DETAILED DESCRIPTION OF THE INVENTION

The present invention is a plasmon shield structure for use with an edge plasmon generator (EPG) in a TAMR write head so that an optical spot projected by a plasmon generator onto the magnetic media during a thermally assisted write process can be reduced in one or both of the down-track direction and cross-track direction thereby increasing the areal density in TAMR. Plasmon generator may be used interchangeably with plasmon antenna in the embodiments described herein. Moreover, the write head may be part of a merged read/write head design. Furthermore, various embodiments provide for including a trailing shield, or for a leading shield when the role of main pole and trailing shield is reversed. Although the exemplary embodiments depict a plasmon generator having a triangular shape, the present invention also encompasses other shapes for PA or PG structures wherein an edge plasmon mode is generated. The present invention is also a method for forming a plasmon shield adjacent to a waveguide and EPG in a TAMR write head. The terms surface and side may be used interchangeably when referring to a component such as a plasmon shield or waveguide. A top surface of a TAMR component is defined as one that is facing a main pole layer.

Figure 3:
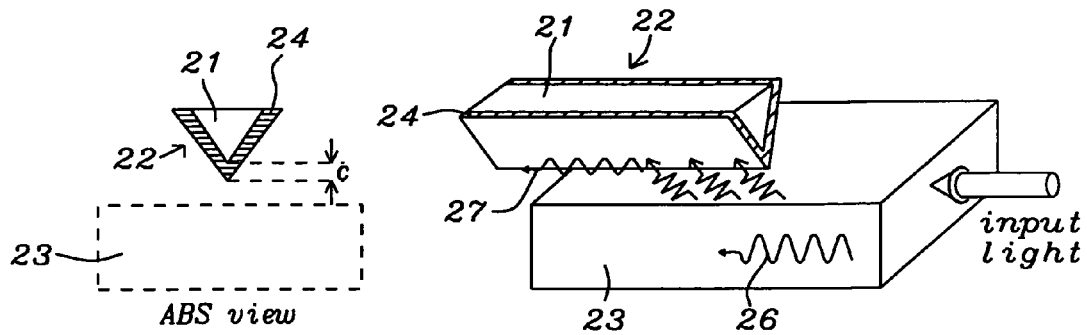
FIG. 3 depicts a TAMR structure previously disclosed by the inventors wherein a triangular shaped EPG has two sides made of a non-magnetic plasmon material while the third side and the core are comprised of a magnetic material.

Referring to FIG. 3, a plasmon antenna (PA) design is shown that was previously disclosed by the inventors in related patent application Ser. No. 12/456,290 and has a triangle shape to couple the edge plasmon mode 27 to the input light 26 from the waveguide 23. Unlike the prior art, PA 22 comprises a magnetic core 21 and a plasmon layer 24 also known as an edge plasmon generator (EPG) having a thickness c on two sides of the core that face the waveguide 23. The plasmon mode is generated by radiative coupling with optical frequency electromagnetic radiation generated by an optical laser or the like and is transmitted toward the ABS within the EPG 24 while the magnetic core 21 concentrates magnetic flux close to the heating point of the PA and enhances the magnetic field (not shown) at the magnetic medium heating location during writing. Thus, the PA 22 effectively becomes an extension of the magnetic pole producing a magnetic field whose maximum gradient overlaps the magnetic medium region being heated by edge plasmons produced in the EPG 24. The close overlap improves the effectiveness of a magnetic field from the write pole in changing local magnetization of the magnetic medium so that magnetic writing is greatly enhanced and can be confined to small surface areas.

Herein we disclose additional improvements in our TAMR design that relate to reducing the optical spot size projected onto the magnetic medium thereby further improving the write performance of the TAMR head. In particular, various embodiments are described wherein a plasmon shield is included proximate to an EPG tip in a TAMR design so as to provide a higher focusing effect on the optical spot without compromising the optical efficiency of the edge plasmon mode or changing the tip size or tip angle of the plasmon antenna. Those skilled in the art will appreciate that the plasmon shield described herein may be employed with other plasmon generators in addition to the EPG design shown in the exemplary embodiments. The plasmon shield is made of noble metals or their alloys with a thin skin depth at the optical frequencies employed in the TAMR head so that the electric field is shunted quickly at the plasmon shield surface and retained in the vicinity of the vertex of the plasma antenna instead of dispersing in a direction away from the vertex. In effect, the plasmon shield serves as a mirror to maintain the edge plasmon mode within a smaller radius of the vertex than would be possible without a plasmon shield. As a result, optical spot size is considerably reduced in cross-track and down-track directions to improve the performance of the thermal assist writing process.

Referring to FIGS. 4a-4d, various embodiments of the present invention are depicted from an ABS view wherein a surface of a plasmon shield 34 faces the vertex 32v of an EPG layer 32 that adjoins a magnetic core 33 and a main pole layer 31. Dielectric layers and an adjacent waveguide are not illustrated in these drawings. Magnetic core 33 and main pole layer 31 may be comprised of one or more of Co, Fe, Ni, and B, or alloys thereof. In one aspect, main pole 31 and magnetic core 33 may have the same composition. Magnetic core 33 and EPG 32 form a triangular shaped plasmon antenna 39. EPG 32 is preferably made of Au or Ag with a thickness from about 10 to 100 nm and extends in a z-axis (lengthwise) direction perpendicular to the ABS. In one embodiment, EPG 32 includes two sides which converge at the vertex 32v to form a "V" shape and overlay on the magnetic core 33 that forms a third side of the PA 39. Note that the third side 39s preferably adjoins main pole 31 and may be considered part of the leading side of the main pole layer. Trailing side 31s is the side of the main pole 31 opposite to PA 39 at the ABS. It should be understood that the main pole 31 (and TAMR head) move opposite to the y-direction or down-track direction during a write process. The x-axis represents the cross-track direction. In an alternative embodiment as described in related patent application Ser. No. 12/456,290, there may be a separation layer between the plasmon antenna and the main pole layer.

Figure 6A:
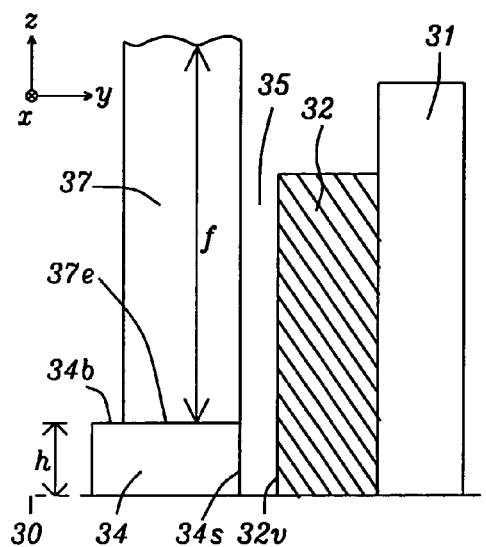
FIGS. 6a-6b are cross-sectional views of embodiments of the present invention that depict various configurations of the plasmon shield and waveguide in a TAMR design.
Figure 6B:
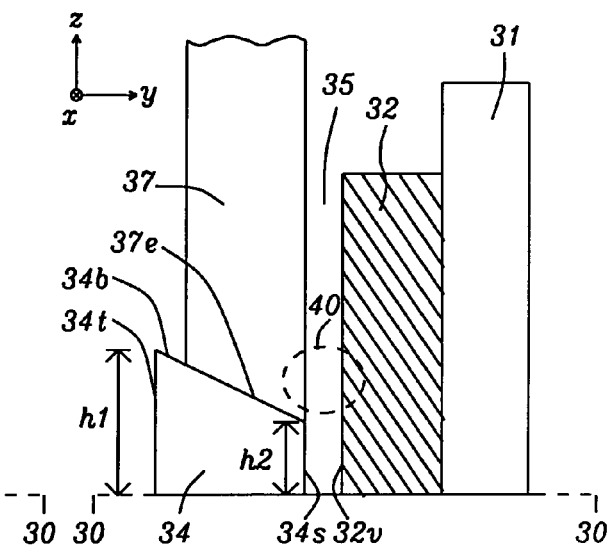
Figure 6C:
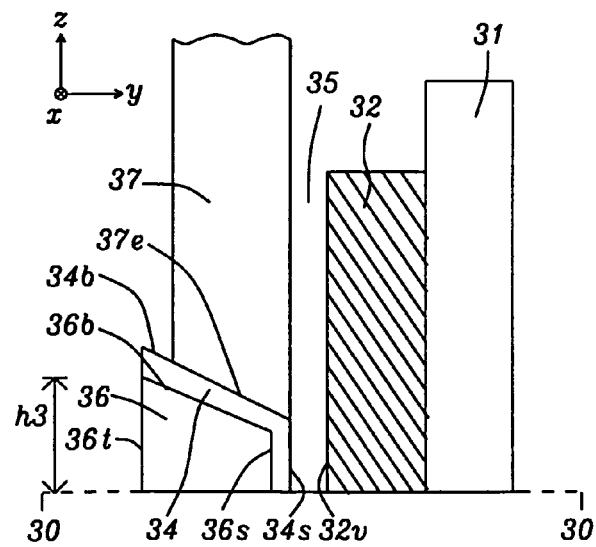
FIG. 6c is a cross-sectional view of an embodiment of the present invention wherein a plasmon shield is formed on a magnetic shield and adjoins a portion of a waveguide in a TAMR design.

Plasmon shield 34 is made of a metal such as Au, Ag, Cu, Al or alloys thereof having a thin skin depth at the optical frequencies transmitted by the waveguide (not shown), and may have cross-track and down-track dimensions sufficiently large to block the waveguide as indicated in FIGS. 6a-6c that will be described in a subsequent section. The thickness of the plasmon shield 34 in the y-axis direction is greater than 200 nm in the embodiments shown as FIGS. 4a-4e while a widthwise dimension along the cross-track direction is from 50 to 500 nm. It should be understood that an optical frequency for the waveguide is selected based on the EPG 32 and plasmon shield compositions. For instance, a diode that emits a wavelength of around 800 nm is preferred for Ag and Au EPGs and plasmon shields while a shorter wavelength of 400-500 nm is employed for an Al EPG and plasmon shield. Likewise, skin depth varies from about 6 nm for Al to around 10 nm for Ag and approximately 20 nm for Au at the indicated wavelengths.

Figure 4A:
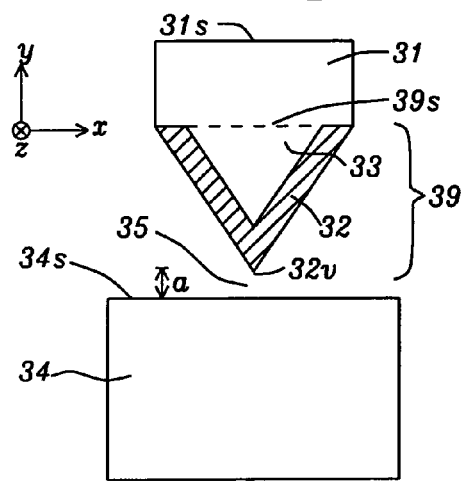
FIGS. 4a-4e are ABS views depicting various embodiments of the present invention in which a triangular shaped EPG adjoins a main pole and there is a plasmon shield facing the EPG vertex to reduce optical spot size.

Referring to FIG. 4a, plasmon shield 34 has a surface 34s that is essentially parallel to trailing side 31s and faces vertex 32v according to one embodiment of the present invention. There is a dielectric layer (not shown) adjoining EPG 32 and planar surface 34s that separates the plasmon shield 34 from vertex 32v. The space (gap) 35 between the substantially planar surface 34s and vertex 32v has a preferred dimension a from 5 to 50 nm and may be tuned to achieve the desired optical spot size and shape on the magnetic medium (not shown). If the gap distance is <5 nm, the electric field (optical spot) is no longer focused at EPG vertex 32v but is undesirably squeezed off to the sides of the tip. For gap distances >50 nm, the capability and advantage of the plasmon shield 34 to reduce the optical spot size is substantially lost. Note that the topography of surface 34s may be modified to optimize the optical spot shape. However, the first embodiment offers an advantage in terms of ease of manufacture.

Figure 4B:
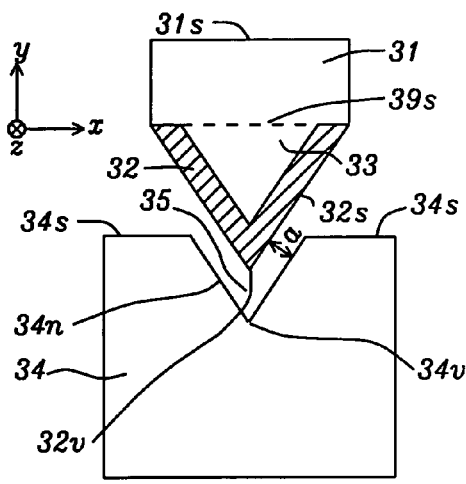

In an alternative embodiment shown in FIG. 4b, a triangular shaped portion of plasmon shield 34 including a portion of surface 34s proximate to vertex 32v may be removed to form a trench having sloped sides 34n that converge at vertex 34v. In one aspect, vertex 34v may be aligned below vertex 32v in a down-track direction and a portion of EPG 32 including vertex 32v may lie within the trench bounded by sides 34n. Thus, remaining portions of surface 34s are parallel to trailing side 31s but the surface 34s is interrupted by a trench having a lengthwise direction along the z-axis and aligned parallel to the lengthwise direction of vertex 32v. Sides 32s of EPG 32 may be aligned substantially parallel to sides 34n to enable a more convenient fabrication process. Sides 32s and 34s are separated by dielectric gap 35 with dimension a. As indicated previously with regard to fabricating structures with a pointed shape, a "V" shape design may translate into a shape with considerable curvature at the tip as a result of fabrication techniques. Therefore, vertex 34v and vertex 32v may include a certain amount of curvature as previously illustrated in FIG. 2b.

Figure 4C:
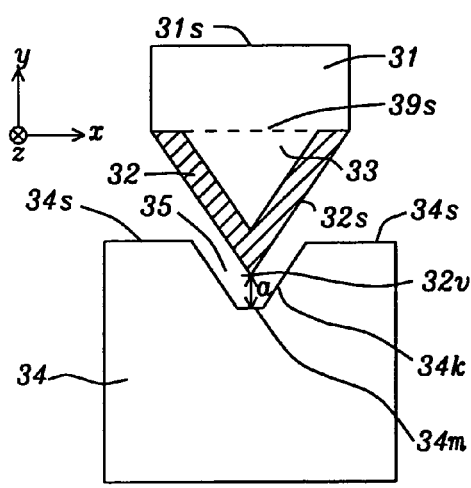

Referring to FIG. 4c, a third embodiment is depicted wherein the trench described in the previous embodiment may be modified to have a trapezoidal shape. In this case, a portion of plasmon shield 34 opposite vertex 32v is removed to form a surface 34s that is interrupted by a trench with two sloped sidewalls 34k that connect to a bottom trench section 34m which is essentially parallel to surface 34s in a z-axis direction. In one aspect, sidewalls 34k may be substantially parallel to sides 32s of EPG 32 and there is a gap distance a between vertex 32v and bottom 34m. Gap 35 as in previous embodiments is filled with a dielectric layer (not shown).

The dielectric gap 35 between EPG 32 and plasmon shield 34 may be tuned in terms of size for the desired optical spot shape in order to have a straight magnetic transition when aligning the magnetic field, and for the desired optical spot size reduction depending on tip radius. The present invention anticipates that the dielectric layer that fills gap 35 between the plasmon generator 34 and EPG 32 may be comprised of a low refractive index material such as alumina, silicon oxide, silicon oxynitride (SiON), or $MgF_2$ to optimize the transmission of the edge plasmon mode (not shown).

Figure 4D:
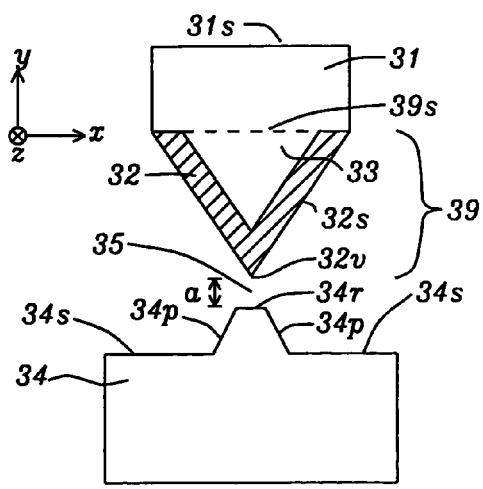

Referring to FIG. 4d, the present invention also encompasses an embodiment wherein the surface 34s has a protrusion opposite vertex 32v. Thus, surface 34s is substantially planar except for a protrusion or ridge comprised of two sides 34p that connect surface 34s with a flat side 34r proximate to vertex 32v. In one aspect, side 34r is substantially parallel to surface 34s and is separated from vertex 32v by dielectric gap 35 with dimension a in the y-axis direction. It should be understood that side 34r extends perpendicular to the ABS, is parallel to EPG vertex 32v in a z-axis direction, and is aligned in a down-track direction from the plasmon generator vertex.

Figure 4E:
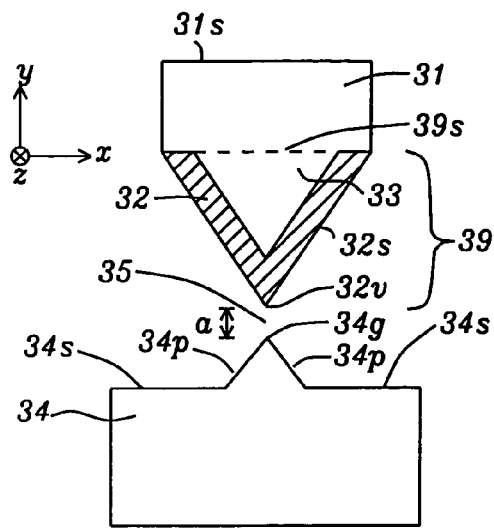

Referring to FIG. 4e, an embodiment is shown that represents a modification of FIG. 4d where the protrusion opposite vertex 32v has a pointed shape that may be an inverted "V" shape or an inverted "V" shape with a certain amount of curvature proximate to the junction of the two sides. Therefore, side 34r is removed from the previous embodiment, and remaining sides 34p in the protrusion converge at a vertex 34g where vertex 34g is preferably aligned below vertex 32v in a y-axis direction and is separated from vertex 32v by a gap distance a.

The present invention also anticipates that a magnetic shield structure may be included in the TAMR head design to optimize both optical and magnetic performance in the writing process. In the exemplary embodiments shown in FIGS. 5a-5g, the shield is depicted as a leading shield 36 adjoined to a surface of the plasmon shield 34 such that the plasmon shield is formed between the leading shield and EPG 32. In particular, FIGS. 5a-5e represent modifications of FIGS. 4a-4e, respectively, wherein a leading shield is included on a side of the plasmon shield that is opposite surface 34s and the plasmon shield forms a substantially conformal coating on leading shield 36. Leading shield 36 may be comprised of one or more of Co, Fe, Ni, and B, or an alloy thereof.

Furthermore, the present invention includes an embodiment (not shown) wherein the role of the main pole and magnetic shield may be switched depending on the magnetic materials employed in the main pole and shield and the configuration of the yoke and coils as appreciated by those skilled in the art. Thus, magnetic shield 36 adjoining a plasmon shield surface opposite 34s may be considered a trailing shield.

Figure 5A:
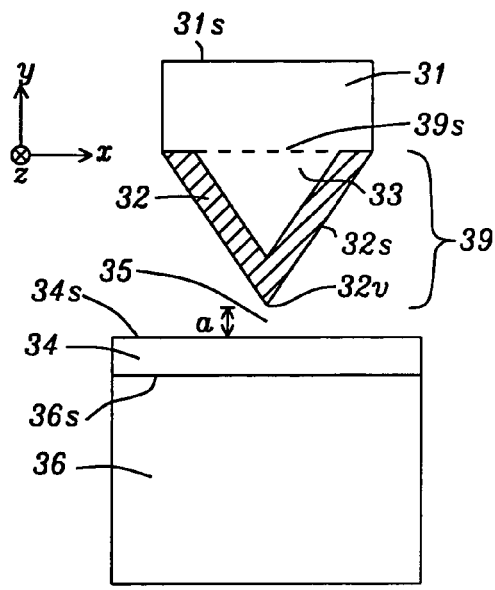
FIGS. 5a-5g are ABS views depicting various embodiments of the present invention in which a triangular shaped EPG adjoins a main pole and there is a plasmon shield formed on a magnetic shield and facing the EPG vertex to reduce optical spot size in a TAMR design.
Figure 5B:
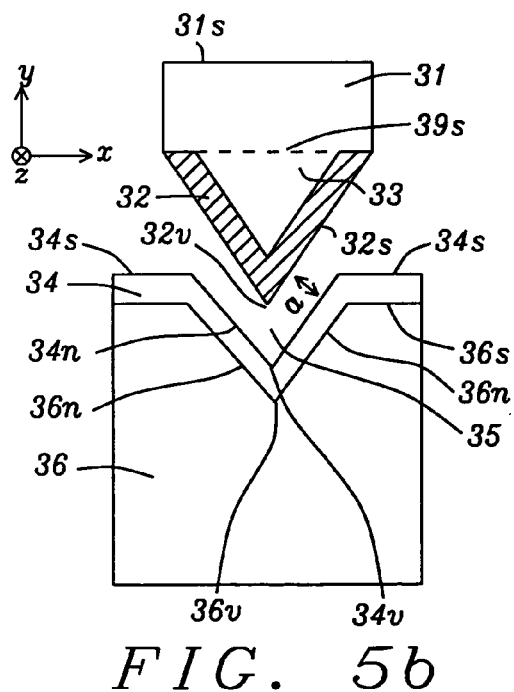

Referring to FIG. 5a, a TAMR design is depicted that is the same as described earlier with respect to FIG. 4a except a top surface 36s of a leading shield 36 adjoins the plasmon shield 34 along a section that is opposite surface 34s. In this case, plasmon shield 34 has a smaller thickness in the y-axis direction than in FIG. 4a and may be only from 1 to 100 nm thick. Surface 34s is preferably parallel to top surface 36s. Likewise, the embodiment represented by FIG. 5b is the same as that illustrated in FIG. 4b except for the addition of the leading shield 36 adjoining a section of plasmon shield 34 opposite surface 34s. Preferably, the top surface 36s of the leading shield interfaces with a first section of plasmon shield 34 opposite surface 34s and has a planar section but also a trench formed by sides 36n that converge within leading shield 36. In the preferred embodiment where plasmon shield is a conformal layer on leading shield 36, each of the two top surface sections 34n are substantially parallel to an underlying side 36n and converge at a vertex 34v that is aligned in a y-axis direction between vertex 32v and vertex 36v. Surface section 36s is parallel to surface 34s and connects with sides 36n.

Figure 5C:
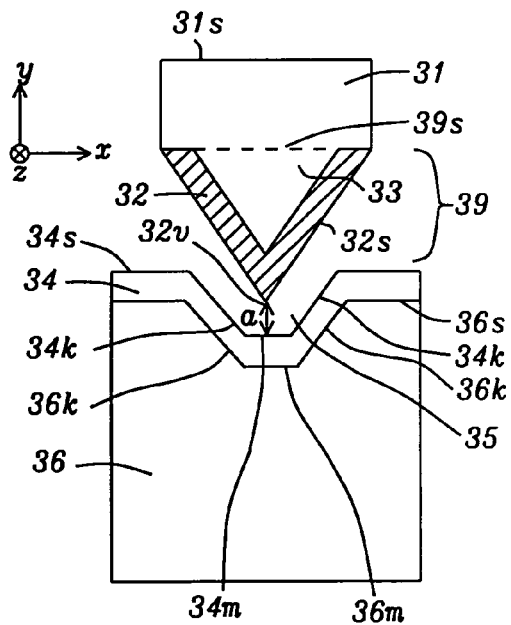

FIG. 5c is an embodiment that represents a modification of FIG. 4c in which the leading shield 36 adjoins a section of plasmon shield 34 opposite surface 34s and has a top surface interfacing with the plasmon shield that includes a surface section 36s formed parallel to surface 34s, and a trench that includes sides 36k which connect to a trench bottom 36m. Preferably, a top surface of plasmon shield 34 that includes surface 34s conforms to surface 36s, sides 36k, and bottom 36m. Therefore, each of the two top surface sides 36k are substantially parallel to an overlying side 34k and trench bottom 34m is aligned between trench section 36m and vertex 32v in a y-axis direction. Top surface sections 36s of leading shield 36 are parallel to surface 34s and connect with sides 36k. Trench bottom 36k is aligned parallel to vertex 32v in a z-axis direction. FIGS. 5b and 5c are so-called concave shaped designs for the plasmon shield and adjoining magnetic shield.

Figure 5D:
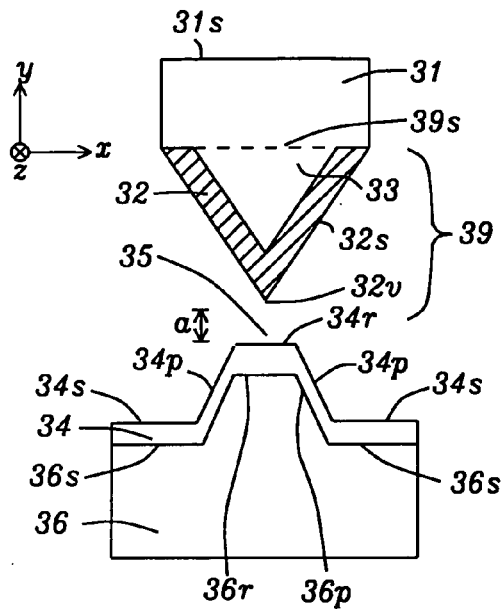

FIG. 5d is a fourth embodiment of a plasmon shield/leading shield design that represents a modification of FIG. 4d wherein the leading shield 36 adjoins a section of the plasmon shield 34 opposite surface 34s. Preferably, the plasmon shield conforms to a top surface of leading shield 36 that includes surface 36s, sides 36p, and side 36r thereby providing a so-called convex shaped design for the plasmon shield and adjoining leading shield. Each of the two top surface sections 34p is substantially parallel to an underlying side 36p, and side 34r is aligned above surface section 36r in a y-axis direction. Top surface sections 36s of leading shield 36 are parallel to surface 34s and connect with side 36r through a side 36p. As a result, sides 36r, 36p form a protrusion on leading shield 36 wherein the side 36p is aligned parallel to vertex 32v in a z-axis direction, and below vertex 32v in a down-track direction along the y-axis.

Figure 5E:
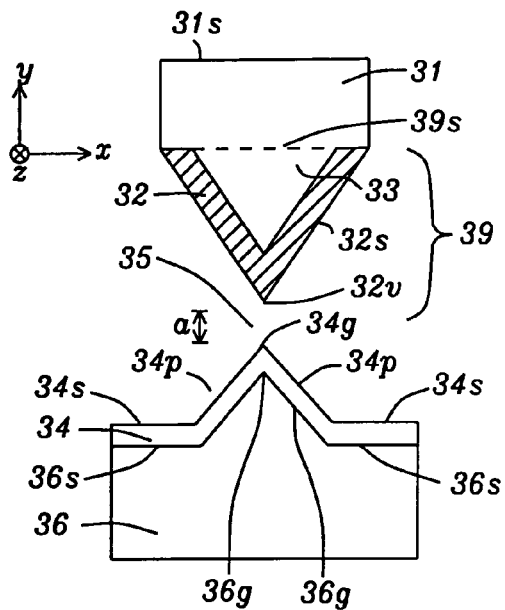

FIG. 5e illustrates a fifth embodiment of the present invention and represents a modification of FIG. 4e wherein the leading shield 36 adjoins a section of plasmon shield 34 opposite surface 34s. Preferably, the plasmon shield conforms to a top surface of leading shield 36 that includes surface 36s and sides 36p thereby providing a convex shaped design for the plasmon shield and adjoining leading shield. Each of the two surface sections 34p is substantially parallel to an underlying side 36p. Top surface sections 36s of leading shield 36 are parallel to surface 34s and connect with sides 36p. As a result, sides 36p form a protrusion on leading shield 36 and converge at vertex 36g which is aligned substantially parallel to vertex 32v and vertex 34g in a z-axis direction, and below vertex 32v in a down-track direction along the y-axis.

Figure 5F:
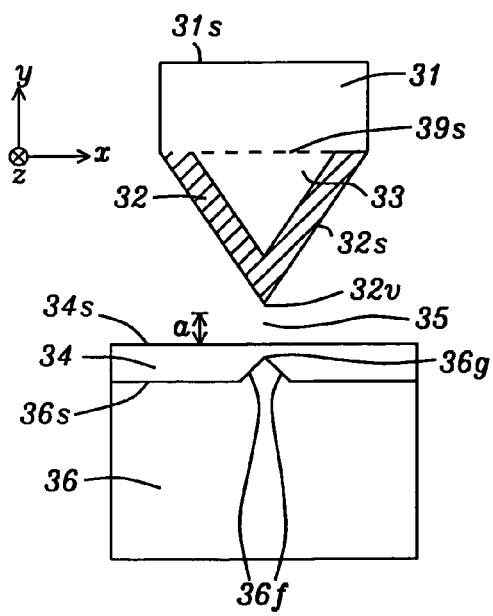

In FIG. 5f, a sixth embodiment of an integrated plasmon shield/leading shield design is illustrated where a triangular shaped notch is removed from plasmon shield 34 along the interface with leading shield 36. Thus, an inverted trench or protrusion having two sides 36f that converge at a vertex 36g is formed on a leading shield top surface opposite surface 34s and within plasmon shield 34. Preferably, plasmon shield 34 forms a conformal layer on leading shield 36, and vertex 36g is preferably aligned below vertex 32v in a y-axis direction and is separated from EPG 32 by a portion of plasmon shield 34 including surface 34s. Note that the triangular shaped section within the inverted trench may be considered an extension of leading shield 36. Vertex 36g is aligned parallel to vertex 32v in a z-axis direction.

Figure 5G:
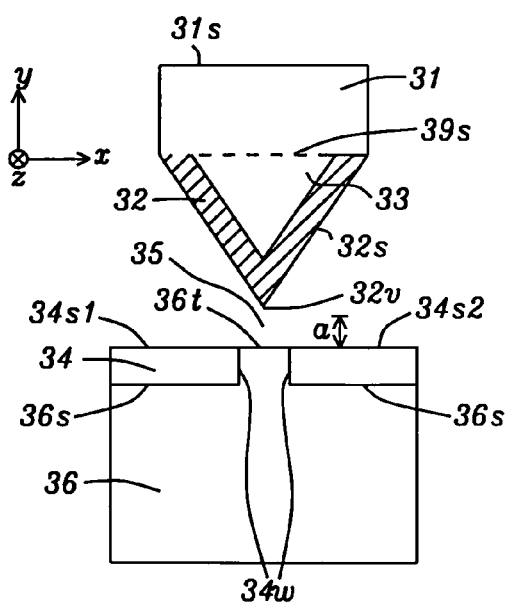

According to a seventh embodiment of an integrated plasmon shield/leading shield design depicted in FIG. 5g, plasmon shield surface 34s may be interrupted by a portion of leading shield including a surface 36t that is formed between sides 34w. In other words, plasmon shield 34 is comprised of two sections having top surfaces 34s1, 34s2, respectively, and the two sections are separated by a rectangular section of leading shield 36 bounded in part by sides 34w and surface 36t. As a result, surface 36t is coplanar with top surfaces 34s1, 34s2 and faces EPG vertex 32v. Dielectric gap 35 separates EPG 32 and surface 36t. Therefore, surface 36t is aligned below vertex 32v in a y-axis direction and is aligned parallel to vertex 32v in a z-axis direction.

Referring to FIG. 6a, the TAMR head of the present invention is shown from a cross-sectional view with the ABS 30-30 along the y-axis (down-track direction) and perpendicular to the plane of the paper along the x-axis (cross-track direction). Dimensions along the z-axis (edge plasmon propagation direction) indicate the distance a component extends towards the back end of the device. For example, plasmon shield 34 has a side 34b opposite the ABS with a uniform height h of 10 to 160 nm. In the exemplary embodiment, waveguide 37 is recessed by a distance h from the ABS 30-30 and extends towards the back end of the device (slider). Main pole 31 may extend a larger distance away from ABS 30-30 than EPG 32. Note that a side of waveguide 37 is coplanar with surface 34s and faces vertex 32v, and a waveguide end 37e preferably interfaces with plasmon shield side 34b opposite the ABS. Plasmon shield side 34b may have a greater length in a y-axis dimension than end 37e and thereby blocks waveguide 37 from an ABS perspective (not shown). In an alternative embodiment, there may be a separation layer (not shown) between waveguide end 37e and plasmon shield side 34b.

Referring to FIG. 6b, improved optical efficiency may be afforded by a tapered shape for plasmon shield 34 such that the distance between the plasmon shield and EPG 32 gradually decreases in a certain region 40 as the EP mode (not shown) propagates towards the ABS. Thus, side 34t that faces away from EPG 32 has a greater height h1 than the height h2 of side 34s. As a result, side 34b has a taper towards EPG 32. In one embodiment, waveguide 37 has a tapered end 37e that adjoins plasmon shield 34 along a section of side 34b. Either FIG. 6a or FIG. 6b may be a cross-sectional view that corresponds to an embodiment depicted in the ABS views found in FIGS. 4a-4d.

Referring to FIG. 6c, a cross-sectional view corresponding to one of the TAMR structures shown in FIGS. 5a-5f is depicted wherein the plasmon shield 34 adjoins a leading shield 36. In the exemplary embodiment, both plasmon shield 34 and leading shield 36 have a tapered side, 34b and 36b, respectively, opposite the ABS 30-30. Leading shield 36 has a side formed along the ABS and a first section of plasmon shield including surface 34s terminates at the ABS. In this case, the first section including surface 34s is primarily responsible for maintaining an electric field from the plasmon mode proximate to vertex 32v. In addition, side 36s has a smaller height in the z-axis direction than height h3 of a leading shield side 36t opposite side 36s. The tapered plasmon shield side 34b affords the same advantage as described earlier with respect to FIG. 6b and interfaces with waveguide end 37e along a substantial portion of side 34b. Side 34b may be considered as part of a second section of plasmon shield 34 that is connected to the first section. Accordingly, a first end of side 34b connected to surface 34s is formed a lesser distance from the ABS than a second end of side 34b which is opposite the first end. Leading shield 36 has a surface 36s facing EPG 32 and interfaces with the first section of plasmon shield opposite surface 34s. Preferably, plasmon shield 34 is a conformal layer with respect to sides 36b and 36s such that tapered side 34b is essentially parallel to tapered side 36b, and surface 34s is essentially parallel to surface 36s and to trailing side 31s. As in previous embodiments, surface 34s is preferably coplanar with a side of waveguide 37 that faces EPG 32.

Figure 7:
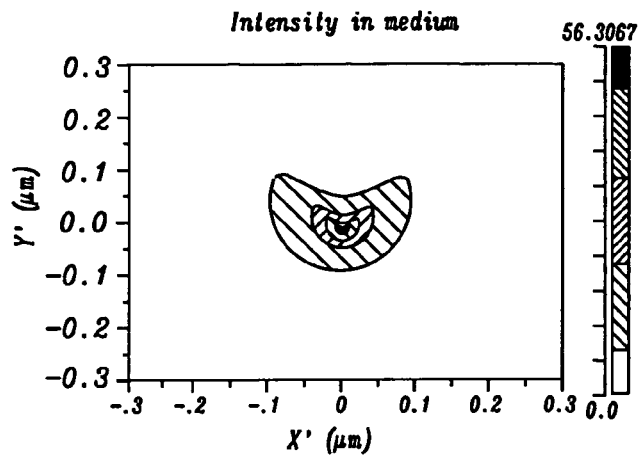
FIG. 7 is a plot showing simulation results that show optical intensity in the medium as a function of x and y coordinates when a plasmon shield is not employed.
Figure 8:
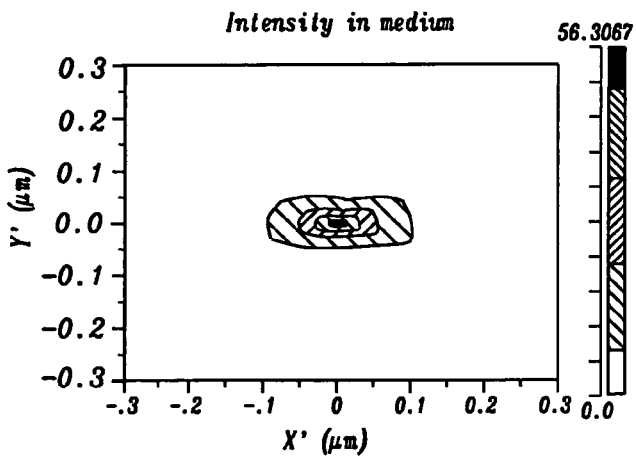
FIG. 8 is a plot of simulation data that shows how optical spot size in the medium can be reduced compared with FIG. 7 by using a plasmon shield in a TAMR head according to an embodiment of the present invention.

Referring to FIGS. 7-8, simulation results are shown for two TAMR structures including a design represented by FIG.

4a (and FIG. 6a) and a conventional EPG design without a plasmon shield. Optical modeling using a finite-difference time domain (FDTD) method was conducted to demonstrate the function of a plasmon shield and reduction in optical spot size due to the presence of a plasmon shield. The tip radius in both examples is 25 nm which is a size that can be readily manufactured in a reliable manner. FIG. 7 shows the electric field intensity distribution in the medium which is placed a 5 nm distance underneath the ABS side of the magnetic head in a conventional EPG design without a plasmon shield. In this case, the waveguide is fully extended to the ABS. FIG. 8 shows the electric field intensity distribution in the same location in the medium when a plasmon shield is included between the waveguide and ABS and is positioned 30 nm from the EPG vertex (tip). Note that peak intensity in both examples is similar which means the plasmon shield does not reduce optical efficiency of the edge plasmon mode when optimally configured with the EPG. A large benefit is clearly observed with a substantial reduction in optical spot size in FIG. 8. In particular, the shape of the optical spot is more confined underneath the EPG tip instead of dispersing along the two sides of the EPG. A more confined spot is believed likely to assist in straightening out the transition during TAMR writing.

Figure 9:
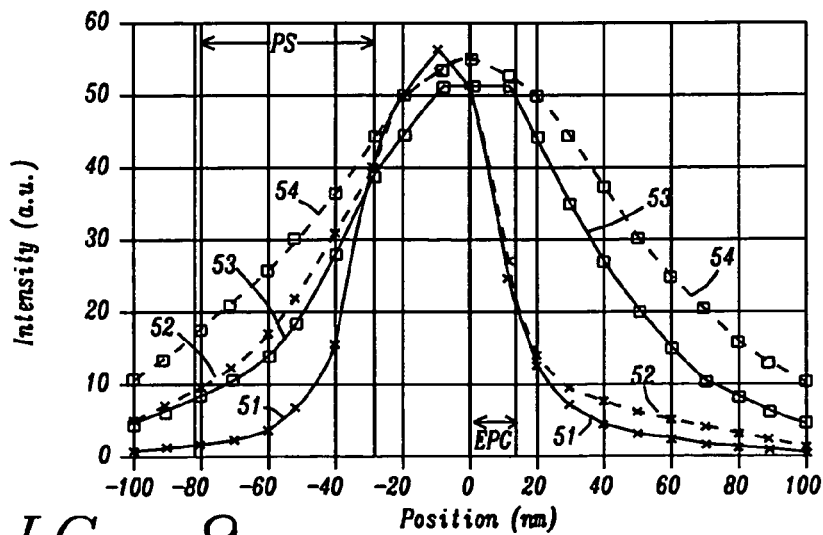
FIG. 9 is plot showing intensity profiles in down-track and cross-track directions for the two TAMR configurations represented in FIGS. 7 and 8 that indicates a full width high magnitude (FWHM) spot size reduction for the design with a plasmon shield.

Referring to FIG. 9, intensity profiles in the down-track and cross-track directions of the two TAMR examples previously described with respect to FIGS. 7-8 are shown to quantitatively demonstrate the improvement with the design including a plasmon shield according to an embodiment of the present invention. Full-Width High Magnitude (FWHM) spot size is reduced from about 100 nm to 70 nm (30% reduction) in the cross-track direction and from 50 nm to 45 nm in the down-track direction in the presence of a plasmon shield. FWHM spot size for the conventional example can be determined by the distance between the left hand section and right hand section of curve 54 along the 30% intensity line for the cross-track dimension, and between left and right hand sections of curve 52 for the down-track dimension. Similarly, FWHM spot size for the plasmon shield example can be determined by the distance between the left and right hand sections of curve 53 for the cross-track dimension, and between left and right hand sections of curve 51 for the down-track dimension. As a result of the optical spot size reduction, the thermal spot will be reduced and the thermal gradient will improve as well. Moreover, when the plasmon shield of the present invention is combined with the advantages of an improved overlay of the magnetic field and thermal gradient on a magnetic medium, a greater effective recording field gradient will be realized and lead to higher performance necessary for high density designs in the ~1-10 Tbit/in$^2$ range.

The present invention includes a method of fabricating a TAMR head with a plasmon shield separated by a gap layer from a plasmon generator and main pole structure. In the exemplary embodiment illustrated in FIGS. 10-18, a process sequence is shown for making a plasmon shield with a design represented by FIG. 4a from an ABS view and by FIG. 6a from a cross-sectional view.

Figure 10:
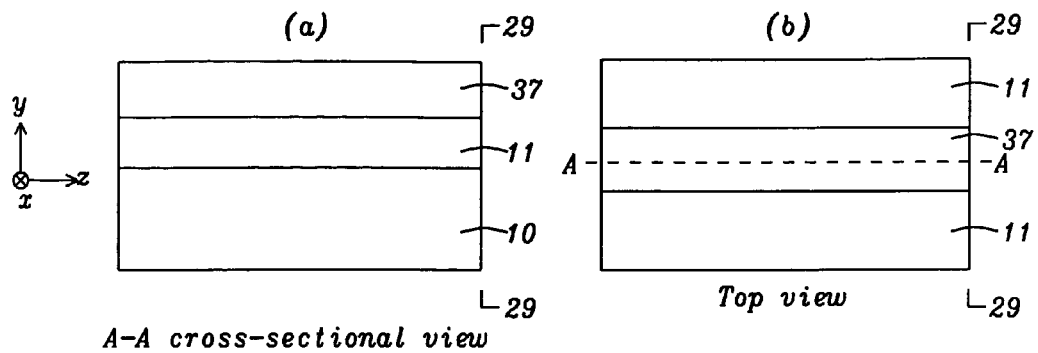
FIGS. 10-18 depict a series of steps used to form a TAMR head having a plasmon shield separated from a plasmon generator (EPG)/main pole configuration by a gap layer according to one embodiment of the present invention.

Referring to FIG. 10, a sub-structure 10 is provided that typically consists of an AlTiC substrate and a read head (not shown) including a sensor structure. A cladding material such as a dielectric layer 11 is deposited on the sub-structure and then a waveguide core layer 37 hereafter referred to as "waveguide" is laid down on the dielectric layer 11 by a conventional process. From a top-down view in side (b) of the drawing, the waveguide appears as a stripe that partially covers dielectric layer 11 and has a lengthwise dimension in the z-axis direction. A (−) z-axis direction in this context means towards the back end of the TAMR head. From the top-down perspective, waveguide 37 has a width along an x-axis (cross-track) direction. There is a plane A-A depicted that essentially bisects the waveguide along the lengthwise direction. Plane 29-29 represents a front end of the device. Note that the waveguide 37 has a thickness along the y-axis (down-track) direction from the A-A cross-sectional view on side (a) of FIG. 10. It should be understood that the ABS (plane 30-30 in FIG. 18) will be formed substantially parallel to plane 29-29 and in a (−) z-axis direction with respect to plane 29-29 after all layers are formed and a lapping process is completed.

Figure 11:
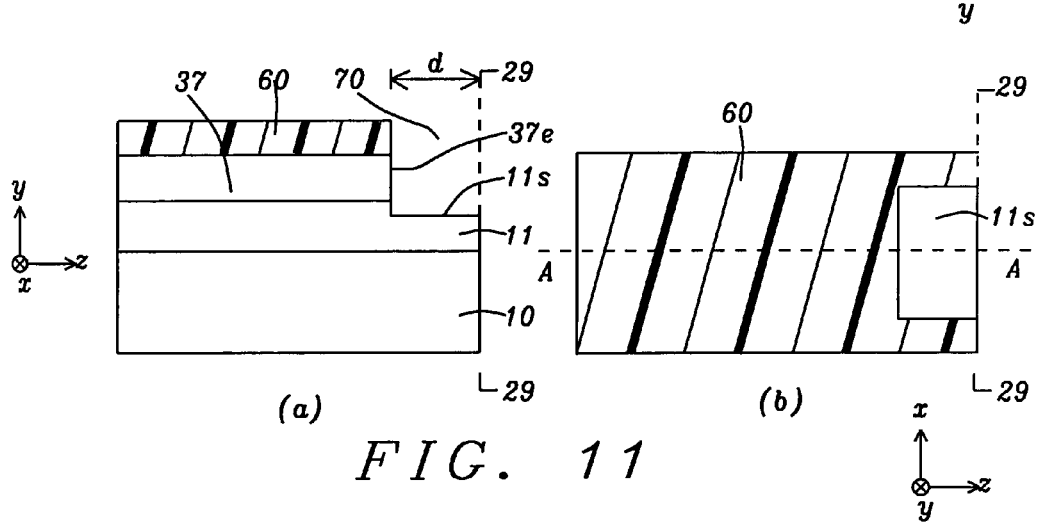

Referring to FIG. 11, a photoresist layer 60 is coated and patterned on waveguide 37 with an opening 70 along plane 29-29 and extending a distance d in a z-axis direction as indicated in a cross-sectional view in side (a). A conventional reactive ion etch process may be used to transfer the opening through exposed regions of waveguide 37 and dielectric layer 11. The etch process does not penetrate through the entire thickness of dielectric layer 11 but leaves a top surface 11s adjacent to plane 29-29. A front end 37e of waveguide 37 faces plane 29-29. From a top-down view in side (b), top surface 11s appears as a rectangular shape.

Figure 12:
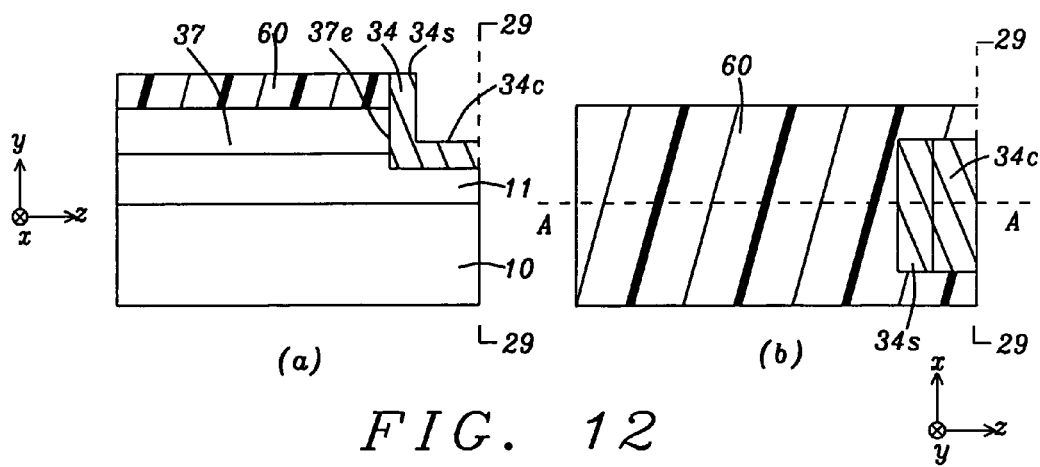

Referring to FIG. 12, a plasmon layer 34 as described previously is deposited into opening 70 by a conventional method that forms a substantially conformal coating on the sidewall including front end 37e and on surface 11s. Thus, a first section of plasmon layer having a top surface 34s is formed along the front end 37e and a second section of plasmon layer with a top surface 34c is formed on top surface 11s as depicted in side (a). From a top-view in side (b), top surfaces 34c, 34s each have a rectangular shape and are adjoined along a common side that is parallel to plane 29-29.

Figure 13:
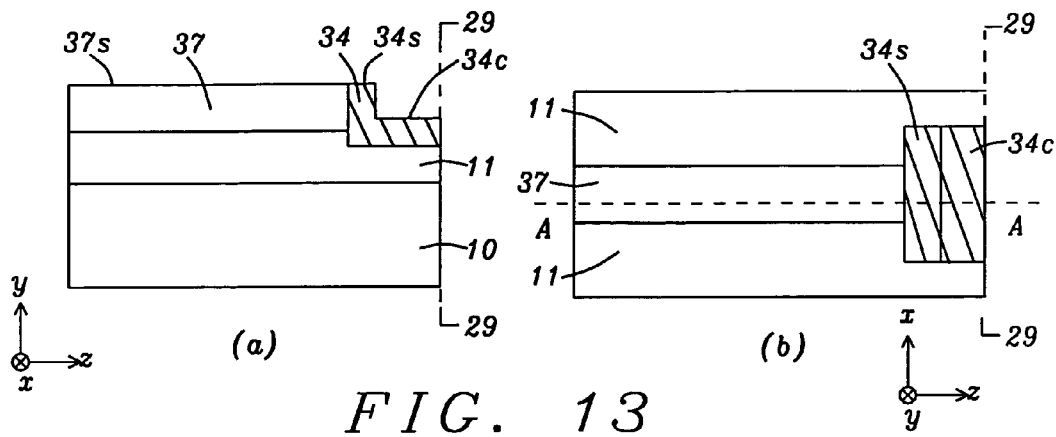

Referring to FIG. 13, photoresist 60 is stripped by a well known method and then a CMP process is performed to remove a top section of plasmon layer 34 such that top surface 34s is now coplanar with a top surface 37s of waveguide 37 as illustrated in side (a).

Figure 14:
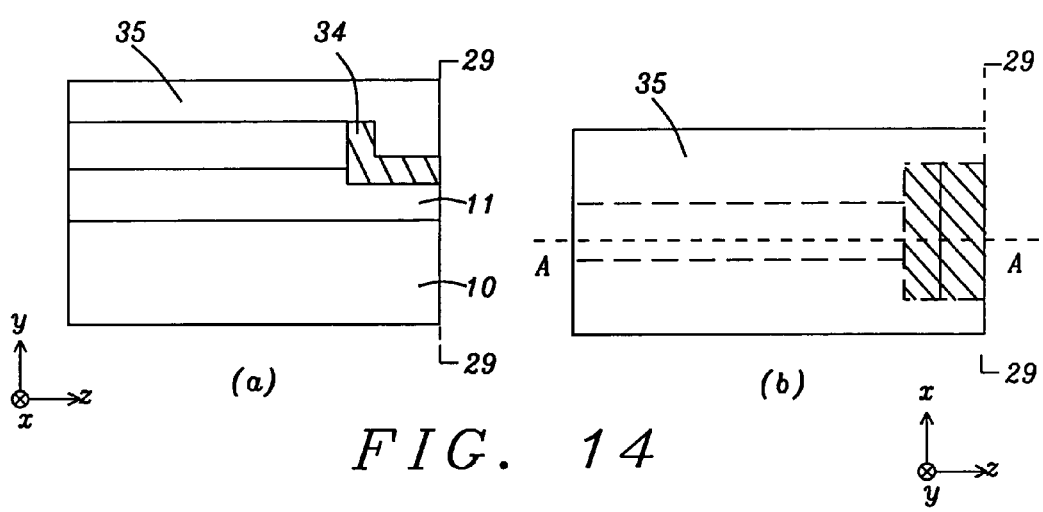

In FIG. 14, the gap layer 35 is deposited by a chemical vapor deposition (CVD), plasma vapor deposition (PVD), or the like on top surfaces 34c, 34s, 37s, and on exposed regions of dielectric layer 11. The gap layer 35 may be planarized by a CMP step, if necessary.

Figure 15:
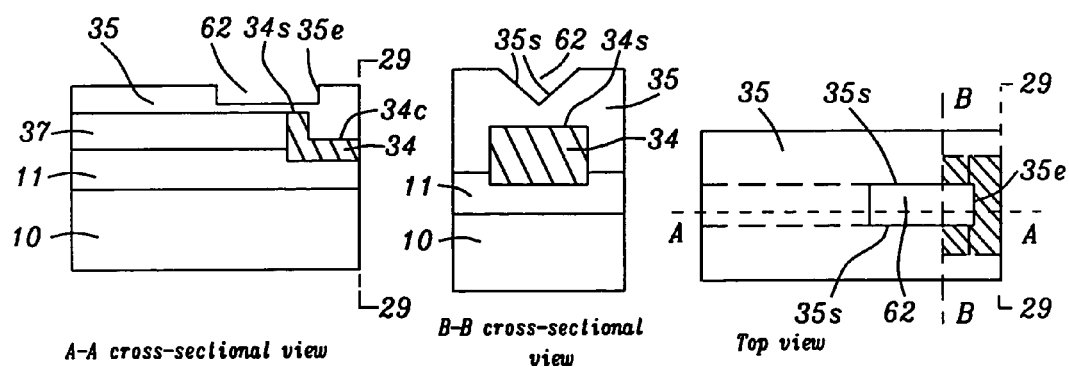

Referring to FIG. 15, a "V" shaped trench is formed in gap layer 35 by a standard photoresist patterning and etching sequence that comprises forming a rectangular shaped opening in a coated photoresist layer (not shown) and then employing an ion beam etch (IBE) in which ion beams are directed at the photoresist opening at an angle thereby defining a trench 62 with sloped sidewalls 35s. Note that from an A-A cross-sectional view, the IBE does not penetrate through the entire thickness of gap layer 35 but leaves a thinned section of gap layer above a front end of waveguide 37 and above top surface 34s. A front end 35e of the trench 62 is aligned parallel to plane 29-29 and is preferably aligned above surface 34c. The lengthwise dimension of trench 62 in a z-axis direction corresponds to the desired length of the plasmon generator including EPG layer 32 to be deposited in a subsequent step. In the top-down view on the right side of FIG. 15, a second plane B-B is included that is parallel to plane 29-29 and adjoins plasmon layer 34 on a side opposite plane 29-29. The B-B cross-sectional view shows the "V" shape with sidewalls 35s in trench 62 which is aligned above top surface 34s.

Figure 16:
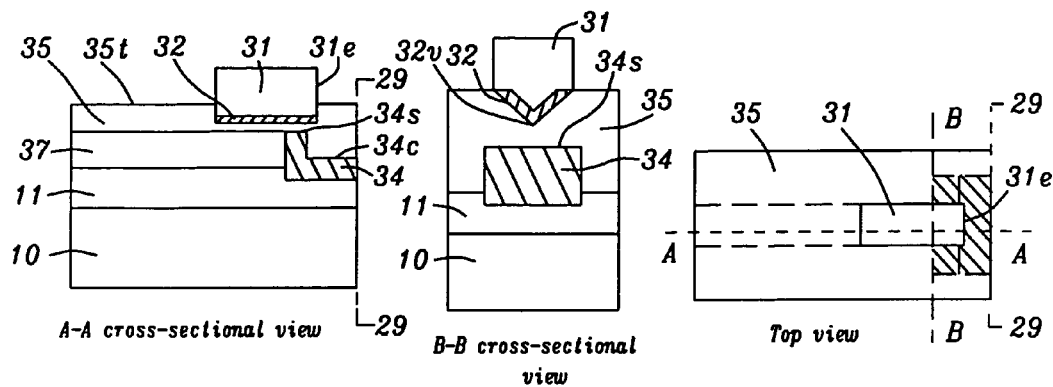

Referring to FIG. 16, an EPG layer 32 is deposited by a sputter deposition method, for example, and conformally covers sidewalls 35s but does not entirely fill trench 62. the sides of EPG layer 32 converge at a vertex 32v. Thereafter, a magnetic material is deposited to form main pole layer 31 that not only fills the upper portion of trench 62 but extends a certain distance above top surface 35t. At this point, the photoresist mask used in the IBE process that initially formed trench 62 may be removed. As a result, main pole 31 and EPG 32 are recessed a certain distance from plane 29-29 but are aligned above a front section of waveguide 37 and above top surface 34s. Preferably, front end 31e of main pole 31 is aligned above surface 34c.

Figure 17:
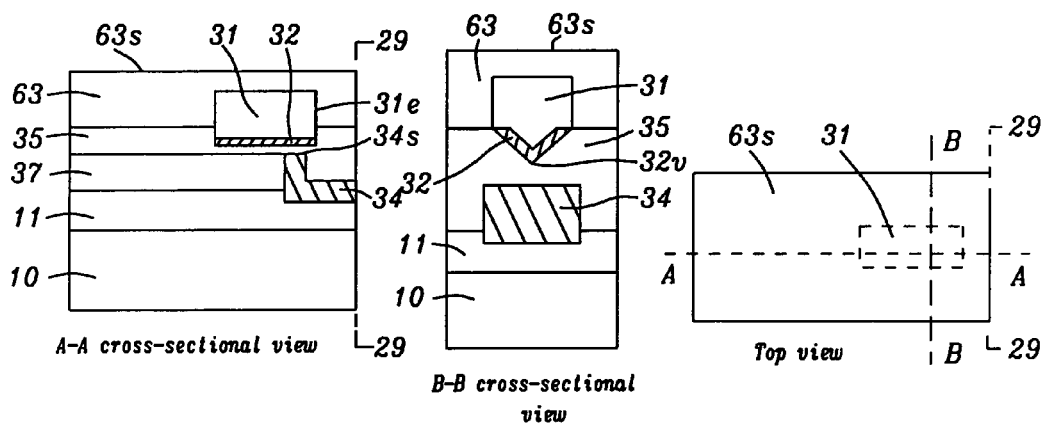

Referring to FIG. 17, an overcoat layer 63 is deposited on gap layer 35 and main pole 31 by a CVD or PVD method, for example, and may be comprised of a dielectric material. A CMP process may be used to form a smooth top surface 63s.

Figure 18:
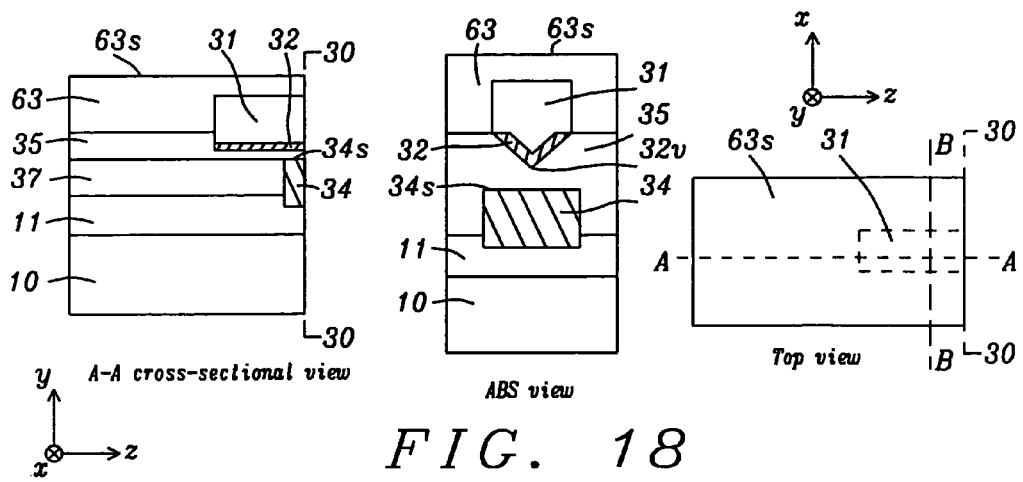

In FIG. 18, the ABS 30-30 is shown after a conventional lapping step is employed to remove a front side of the TAMR head adjacent to plane 29-29. Thus, a portion of plasmon layer 34 including top surface 34c is removed to leave a plasmon shield 34 having a side formed along the ABS and a top surface 34s adjacent to gap layer 35 and facing EPG 32. Note that a front end 31e of main pole 31 and an underlying portion of EPG 32 are also removed during the lapping process so that there is a side of the main pole and EPG formed along the ABS.

Those skilled in the art will appreciate that other embodiments of the plasmon shield 34 represented in FIGS. 4b-4e can be made in a similar manner to the sequence depicted in FIGS. 10-18 that is related to FIG. 4a structure fabrication. In particular, an additional photoresist patterning and etching sequence is required to either form a trench in top surface 34s or form a protrusion on plasmon shield 34 before the gap layer 35 is laid down. Subsequently, a vertex 32v will be formed in EPG layer 32 that is aligned above the plasmon shield trench or protrusion in a lengthwise direction. Furthermore, a magnetic shield 36 as illustrated in FIG. 5a may be formed adjacent to plasmon shield 34 on a side opposite surface 34s by sequentially depositing a magnetic material and then a plasmon material in opening 70 (FIG. 11). Subsequent steps are the same as shown in FIGS. 10-18. With regard to the embodiments represented by FIGS. 5b-5g, an additional photoresist patterning etching sequence is required to modify the top surface 36s of the shield 36 before the plasmon shield layer 34 is deposited. Thereafter, the back end process steps are the same as described with respect to FIGS. 14-18 with the exception that a portion of the top surface 34s (trench or protrusion) is not planar. In the process sequence relating to the embodiments in FIGS. 5a-5g, the lapping process forms an ABS along the magnetic shield 36, plasmon shield layer 34, EPG 32, and main pole 31.

The present invention has an advantage over the prior art in that it provides the unique combination of a smaller than previously realized spot size on the magnetic medium because of the plasmon shield component, and an improved overlay of the magnetic field gradient on the optical spot because of the EPG design disclosed in related patent application Ser. No. 12/456,290. Writing efficiency is improved by a thermal assist mechanism without compromising the optical efficiency of the edge plasmon mode. Furthermore, an EPG tip radius may be employed with a size that is easily reproduced in a manufacturing environment.

While this invention has been particularly shown and described with reference to, the preferred embodiment thereof, it will be understood by those skilled in the art that various changes in form and details may be made without departing from the spirit and scope of this invention.

We claim:

1. A thermally assisted magnetic recording (TAMR) head comprising:
   (a) a main pole layer having a leading edge and a trailing edge formed along an air bearing surface (ABS), said leading edge and trailing edge are part of a leading side and trailing side, respectively, and said TAMR head and main pole layer move in a down-track direction over a magnetic medium during a write process;
   (b) an optical waveguide for directing input light frequencies to a plasmon antenna;
   (c) the plasmon antenna having a first side and magnetic core formed adjacent to the leading edge and leading side of the main pole layer, and a second side and third side comprised of a plasmon layer overlaid on the main core and converging at a vertex (tip) that faces away from the main pole layer, said plasmon layer generates an edge plasmon mode proximate to the vertex when coupled with electromagnetic radiation from the waveguide, and transfers energy from the edge plasmon mode onto a localized region of said magnetic medium thereby heating said localized region and reducing its magnetic coercivity and anisotropy; and
   (d) a plasmon shield formed along the ABS in a down-track direction from the plasmon antenna and main pole layer, and separated from said vertex and plasmon antenna by a dielectric gap layer, said plasmon shield comprises:
      (1) a first side facing the vertex that maintains an electric field from the edge plasmon mode proximate to the vertex thereby reducing the size of an optical spot directed onto said localized region, said first side is formed substantially coplanar with a side of the waveguide that faces the plasmon antenna; and
      (2) a second side opposite the ABS wherein said second side adjoins an end of the waveguide.

2. The TAMR head of claim 1 wherein the first side of the plasmon shield is essentially a planar surface that is formed parallel to the leading side of the main pole layer.

3. The TAMR head of claim 1 wherein the first side of the plasmon shield is comprised of a portion of planar surface, and includes two sides of a trench in the plasmon shield that converge to form a second vertex which is aligned below the plasmon antenna vertex in a down track direction and is parallel to the plasmon antenna vertex in a direction perpendicular to the ABS.

4. The TAMR head of claim 1 wherein the first side of the plasmon shield is comprised of a portion of planar surface, and includes two sides of a trench in the plasmon shield that connect to a bottom section of the trench which is aligned below the plasmon antenna vertex in a down track direction and is aligned parallel to the plasmon antenna vertex in a direction perpendicular to the ABS.

5. The TAMR head of claim 1 wherein the first side of the plasmon shield is comprised of a portion of planar surface, and includes two sides of a protrusion that connect said portion of planar surface to a third side opposite the vertex wherein said third side is aligned below the plasmon antenna vertex in a down track direction and is formed parallel to said portion of planar surface.

6. The TAMR head of claim 1 wherein the dielectric gap layer is comprised of a low refractive index dielectric material comprised of alumina, silicon oxide, SiON, or $MgF_2$ and there is a distance between the vertex and first side of about 5 to 50 nm.

7. The TAMR head of claim 1 wherein the second side of the plasmon shield is formed parallel to the ABS.

8. The TAMR head of claim 1 wherein the second side of the plasmon shield is tapered such that the first side of the plasmon shield extends a shorter distance from the ABS than a side of the plasmon shield that faces away from the plasmon layer of the plasmon antenna.

9. The TAMR head of claim 1 wherein the plasmon shield is comprised of Au, Ag, Cu, Al or alloys thereof.

10. A thermally assisted magnetic recording (TAMR) head comprising:
  (a) a main pole layer having a leading edge and a trailing edge formed along an air bearing surface (ABS), said leading edge and trailing edge are part of a leading side and trailing side, respectively, and said TAMR head and main pole layer move in a down-track direction over a magnetic medium during a write process;
  (b) an optical waveguide for directing input light frequencies to a plasmon antenna;
  (c) the plasmon antenna having a first side and magnetic core formed adjacent to the leading edge and leading side of the main pole layer, and a second side and third side comprised of a plasmon layer overlaid on the main core and converging at a vertex (tip) that faces away from the main pole layer, said plasmon layer generates an edge plasmon mode proximate to the vertex when coupled with electromagnetic radiation from the waveguide and transfers energy from the edge plasmon mode onto a localized region of said magnetic medium thereby heating said localized region and reducing its magnetic coercivity and anisotropy;
  (d) a plasmon shield formed in a down-track direction from the plasmon antenna and main pole layer, and separated from said vertex and plasmon antenna by a dielectric gap layer, said plasmon shield forms an essentially conformal layer on a first surface of an adjoining leading shield and comprises:
    (1) a first section that terminates at the ABS and includes a first side facing the vertex that maintains an electric field from the edge plasmon mode proximate to the vertex thereby reducing the size of an optical spot directed onto said localized region, said first side is formed substantially coplanar with a side of the waveguide that faces the plasmon antenna; and
    (2) a second section connected to said first section and comprising a second side opposite the ABS wherein said second side adjoins an end of the waveguide; and
  (e) the leading shield formed along the ABS and adjoining the first section of plasmon shield opposite the first side, and adjoining the second section of plasmon shield opposite the second side, said first surface of the leading shield interfaces with the first section of plasmon shield.

11. The TAMR head of claim 10 wherein the first surface is essentially planar and is formed parallel to the first side of the plasmon shield and to the leading side of the main pole layer.

12. The TAMR head of claim 10 wherein the first surface has a planar section formed parallel to the first side of the plasmon shield, and includes two sides of a trench that converge to form a second vertex within the leading shield, said second vertex is aligned below the plasmon antenna vertex in a down track direction and is parallel to the plasmon antenna vertex in a direction perpendicular to the ABS.

13. The TAMR head of claim 10 wherein the first surface has a planar section formed parallel to the first side of the plasmon shield, and includes two sides of a trench in the leading shield that connect to a bottom section of the trench which is aligned below the plasmon antenna vertex in a down track direction and is aligned parallel to the plasmon antenna vertex in a direction perpendicular to the ABS.

14. The TAMR head of claim 10 wherein the first surface has a planar section formed parallel to the first side of the plasmon shield, and includes two sides of a protrusion that connect said portion of planar surface to a third side opposite the vertex wherein said third side is parallel to said portion of planar surface, is aligned below the plasmon antenna vertex in a down track direction, and is aligned parallel to the plasmon antenna vertex in a direction perpendicular to the ABS.

15. The TAMR head of claim 10 wherein the first surface has a planar sections formed parallel to two planar sections of the first side of the plasmon shield, and has a rectangular shaped extension with second planar surface formed coplanar with the two planar sections of first plasmon shield side, said rectangular shaped extension separates said two planar first plasmon shield side sections, and said second planar surface is aligned below the vertex in a down-track direction and is aligned parallel to the vertex in a direction perpendicular to the ABS.

16. The TAMR head of claim 10 wherein the second section of the plasmon shield is tapered such that a first end of the second side connected to the first side of the plasmon shield is formed a lesser distance from the ABS than a second end of the second side formed opposite the first end.

17. The TAMR head of claim 10 wherein the plasmon shield is comprised of Au, Ag, Cu, Al, or alloys thereof.

18. The TAMR head of claim 10 wherein the dielectric gap layer is comprised of a low refractive index dielectric material comprised of alumina, silicon oxide, SiON, or $MgF_2$ and there is a distance between the vertex and first side of the plasmon shield of about 5 to 50 nm.

19. A thermally assisted magnetic recording (TAMR) head comprising:
  (a) a main pole layer having a leading edge and a trailing edge formed along an air bearing surface (ABS), said leading edge and trailing edge are part of a leading side and trailing side, respectively, and said TAMR head and main pole layer move in a down-track direction over a magnetic medium during a write process;
  (b) an optical waveguide for directing input light frequencies to a plasmon antenna;
  (c) the plasmon antenna having a first side and magnetic core formed adjacent to the trailing edge and trailing side of the main pole layer, and a second side and third side comprised of a plasmon layer overlaid on the main core and converging at a vertex (tip) that faces away from the main pole layer, said plasmon layer generates an edge plasmon mode proximate to the vertex when coupled with electromagnetic radiation from the waveguide and transfers energy from the edge plasmon mode onto a localized region of said magnetic medium thereby heating said localized region and reducing its magnetic coercivity and anisotropy;
  (d) a plasmon shield formed in a down-track direction from the plasmon antenna and main pole layer, and separated from said vertex and plasmon antenna by a dielectric gap layer, said plasmon shield forms an essentially conformal layer on a first surface of an adjoining trailing shield and comprises:
    (1) a first section that terminates at the ABS and includes a first side facing the vertex that maintains an electric field from the edge plasmon mode proximate to the vertex thereby reducing the size of an optical spot directed onto said localized region, said first side is formed substantially coplanar with a side of the waveguide that faces the plasmon antenna; and (2) a second section connected to said first section and comprising a second side opposite the ABS wherein said second side adjoins an end of the waveguide; and (e) the trailing shield formed along the ABS and adjoining the first section of plasmon shield opposite the first side, and adjoining the second section of plasmon shield opposite the second side, said first surface of the trailing shield interfaces with the first section of plasmon shield.

20. A method of fabricating a TAMR head, comprising:

(a) providing a substrate on which a first dielectric layer and a waveguide layer are sequentially formed, said waveguide layer has a lengthwise dimension along an axis that is perpendicular to a cross-track direction and to a down-track direction, and is patterned to form a stripe having a thickness in the down-track direction and a width in the cross-track direction;

(b) forming a plasmon shield layer between a plane at a front end of the TAMR head and an end of the waveguide layer that faces the front end plane, said plasmon shield layer has a first section adjoining the end of the waveguide layer and with a top surface formed coplanar with a top surface of the waveguide layer, and a second section formed adjacent to the front end plane;

(c) depositing a gap dielectric layer on the waveguide layer and plasmon shield layer, and forming a "V" shaped trench in the gap dielectric layer where said "V" shaped trench has two sidewalls, a front end facing the front end plane, and is aligned in a lengthwise direction above a front end of the waveguide layer, the first section of plasmon shield layer, and over a portion of the second section of plasmon shield layer;

(d) depositing a plasmon generator layer on the two sidewalls to partially fill the trench, said two sidewalls converge to form a vertex that is aligned perpendicular to the front end plane;

(e) depositing a main pole layer on the plasmon generator layer that fills the trench and extends a certain distance above the gap dielectric layer; and (f) performing a lapping step that removes a front end of the TAMR head including the second section of plasmon shield layer along the front end plane and forms an ABS along a front side of the main pole layer, plasmon generator layer, and plasmon shield layer.

21. The method of claim 20 wherein the top surface of the plasmon shield layer faces the plasmon generator vertex and is substantially planar.

22. The method of claim 20 further comprised of forming a trench in the top surface of the plasmon shield layer before the gap dielectric layer is deposited, said trench has a lengthwise dimension that is parallel to the plasmon generator vertex, and is aligned in a down-track direction from the plasmon generator vertex.

23. The method of claim 20 further comprised of forming a protrusion on the top surface of the plasmon shield layer before the gap dielectric layer is deposited, said protrusion has a lengthwise dimension parallel to the plasmon generator vertex, and is aligned in a down-track direction from the plasmon generator vertex.

24. The method of claim 20 wherein the plasmon shield layer is comprised of Au, Ag, Cu, Al, or alloys thereof.

25. The method of claim 20 wherein the dielectric gap layer is made of a low refractive index dielectric material comprised of alumina, silicon oxide, SiON, or $MgF_2$ and there is a distance between the vertex and the top surface of the plasmon shield of about 5 to 50 nm.

26. A method of fabricating a TAMR head, comprising:

(a) providing a substrate on which a first dielectric layer and a waveguide layer are sequentially formed, said waveguide layer has a lengthwise dimension along an axis that is perpendicular to a cross-track direction and to a down-track direction, and is patterned to form a stripe having a thickness in the down-track direction and a width in the cross-track direction;

(b) sequentially forming a magnetic shield layer and then a plasmon shield layer between a plane at a front end of the TAMR head and an end of the waveguide layer that faces the front end plane, said plasmon shield layer has a first section that adjoins the end of the waveguide layer, a top surface formed substantially coplanar with a top surface of the waveguide layer, and a bottom surface interfacing with a top surface of the magnetic shield layer, and a second section formed adjacent to the front end plane;

(c) depositing a gap dielectric layer on the waveguide layer and plasmon shield layer, and forming a "V" shaped trench in the gap dielectric layer where said "V" shaped trench has two sidewalls, a front end facing the front end plane, and is aligned in a lengthwise direction above a front end of the waveguide layer, the first section of plasmon shield layer, and over a portion of the second section of plasmon shield layer;

(d) depositing a plasmon generator layer on the two sidewalls to partially fill the trench, said two sidewalls converge to form a vertex that is aligned perpendicular to the front end plane;

(e) depositing a main pole layer on the plasmon generator layer that fills the trench and extends a certain distance above the gap dielectric layer; and (f) performing a lapping step that removes a front end of the TAMR head including the second section of plasmon shield layer along the front end plane and forms an ABS along a front side of the magnetic shield layer, main pole layer, plasmon generator layer, and plasmon shield layer.

27. The method of claim 26 wherein the top surface of the plasmon shield layer faces the plasmon generator vertex and is substantially planar.

28. The method of claim 26 further comprised of forming a trench in the top surface of the magnetic shield layer before the plasmon shield layer and gap dielectric layer are deposited, said trench has a lengthwise dimension that is parallel to the plasmon generator vertex, and is aligned in a down-track direction from the plasmon generator vertex.

29. The method of claim 26 further comprised of forming a protrusion on the top surface of the magnetic shield layer before the plasmon shield layer and gap dielectric layer are deposited, said protrusion has a lengthwise dimension parallel to the plasmon generator vertex, and is aligned in a down-track direction from the plasmon generator vertex.

30. The method of claim 26 wherein the plasmon shield layer is comprised of Au, Ag, Cu, Al, or alloys thereof.

31. The method of claim 26 wherein the dielectric gap layer is made of a low refractive index dielectric material comprised of alumina, silicon oxide, SiON, or $MgF_2$ and there is a distance between the vertex and the top surface of the plasmon shield of about 5 to 50 nm.

* * * * *